(12) United States Patent
Kameoka et al.

(10) Patent No.: US 12,506,920 B2
(45) Date of Patent: Dec. 23, 2025

(54) INFORMATION PROCESSING APPARATUS, CONTROL METHOD, INFORMATION PROCESSING TERMINAL, AND INFORMATION PROCESSING METHOD

(71) Applicant: Saturn Licensing LLC, New York, NY (US)

(72) Inventors: Shinpei Kameoka, Tokyo (JP); Hideki Asazu, Tokyo (JP); Hidenori Yamaji, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 397 days.

(21) Appl. No.: 17/297,782

(22) PCT Filed: Dec. 6, 2019

(86) PCT No.: PCT/JP2019/047779
§ 371 (c)(1),
(2) Date: May 27, 2021

(87) PCT Pub. No.: WO2020/129695
PCT Pub. Date: Jun. 25, 2020

(65) Prior Publication Data
US 2022/0053228 A1 Feb. 17, 2022

(30) Foreign Application Priority Data
Dec. 21, 2018 (JP) .................... 2018-239329

(51) Int. Cl.
*G10L 15/32* (2013.01)
*G10L 15/22* (2006.01)
(Continued)

(52) U.S. Cl.
CPC ....... *H04N 21/42203* (2013.01); *G10L 15/22* (2013.01); *G10L 15/30* (2013.01);
(Continued)

(58) Field of Classification Search
None
See application file for complete search history.

(56) References Cited

U.S. PATENT DOCUMENTS 11,184,660 B1 * 11/2021 Ewanchuk ....... H04N 21/43635
2012/0053942 A1 * 3/2012 Minamino ............. G10L 15/32
704/E15.001

(Continued)

FOREIGN PATENT DOCUMENTS

JP 2000148772 A 5/2000
JP 2012047924 A 3/2012
(Continued)

OTHER PUBLICATIONS

International Search Report for PCT/JP2019/047779 mailed Feb. 25, 2020; 3 pages.

*Primary Examiner* — Seong-Ah A Shin
(74) *Attorney, Agent, or Firm* — Lerner David LLP

(57) ABSTRACT

The present technology relates to an information processing apparatus, a control method, an information processing terminal, and an information processing method capable of detecting a voice to be recognized by using a microphone in accordance with a user's intention.
An information processing apparatus according to one aspect of the present technology, a main body microphone that is a microphone provided in a housing, and controls which of the main body microphone or a terminal microphone that is a microphone provided in an information processing terminal used for a user's operation is to be used to detect a voice to be recognized, on the basis of a state of the user's operation on the information processing terminal. The present technology can be applied to a TV having a microphone.

12 Claims, 15 Drawing Sheets

(51) Int. Cl.
*G10L 15/30* (2013.01)
*H04N 21/422* (2011.01)
*H04R 1/02* (2006.01)
*H04R 3/00* (2006.01)

(52) U.S. Cl.
CPC ... *H04N 21/4221* (2013.01); *H04N 21/42222* (2013.01); *H04R 1/02* (2013.01); *H04R 3/00* (2013.01); *H04R 2499/11* (2013.01); *H04R 2499/15* (2013.01)

(56) References Cited

U.S. PATENT DOCUMENTS

| | | | |
|---|---|---|---|
| 2015/0382047 A1* | 12/2015 | Van Os | H04N 21/41265 |
| | | | 725/38 |
| 2019/0069058 A1* | 2/2019 | Lemons | G06F 11/325 |
| 2019/0166403 A1* | 5/2019 | Yelton | G10L 15/08 |
| 2019/0172461 A1* | 6/2019 | Jin | G10L 15/30 |
| 2020/0126565 A1* | 4/2020 | Kim | G10L 15/22 |
| 2020/0168223 A1* | 5/2020 | Choi | G10L 15/065 |
| 2020/0202856 A1* | 6/2020 | Ivanov Bonev | G06F 3/167 |
| 2021/0306694 A1* | 9/2021 | Yoo | H04N 21/4852 |

FOREIGN PATENT DOCUMENTS

| | | | |
|---|---|---|---|
| JP | 2014130566 A | 7/2014 | |
| JP | 2018117311 A | 7/2018 | |
| WO | 2015146017 A1 | 10/2015 | |
| WO | 2018043895 A1 | 3/2018 | |
| WO | 2018100743 A1 | 6/2018 | |

* cited by examiner

FIG. 13
A
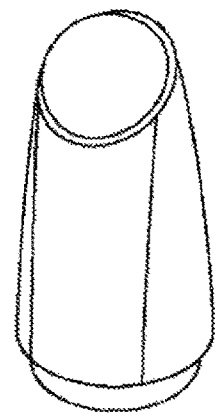
B
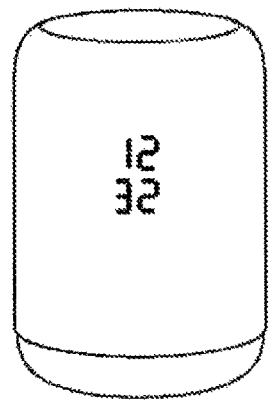

FIG. 14
A
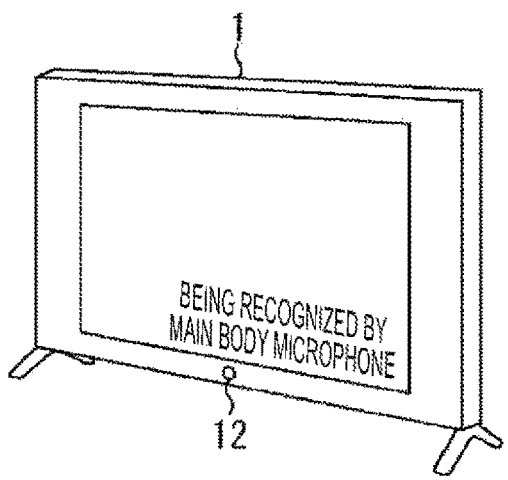
B
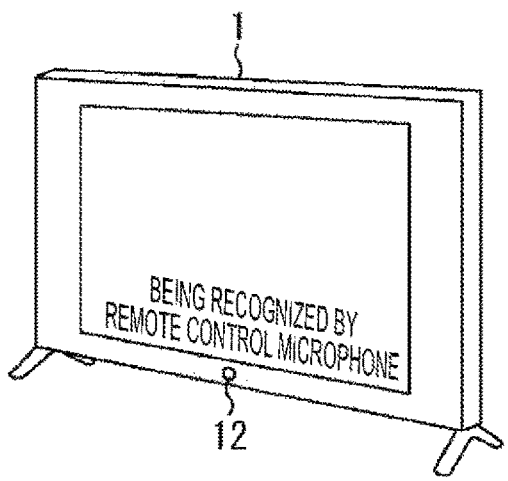

INFORMATION PROCESSING APPARATUS, CONTROL METHOD, INFORMATION PROCESSING TERMINAL, AND INFORMATION PROCESSING METHOD

CROSS-REFERENCE TO RELATED APPLICATIONS

This application is a national phase entry under 35 U.S.C. § 371 of International Application No. PCT/JP2019/047779 filed Dec. 6, 2019, which claims the priority from Japanese Patent Application No. 2018-239329 filed in the Japanese Patent Office on Dec. 21, 2018, the entire contents of which are hereby incorporated by reference.

TECHNICAL FIELD

The present technology relates to an information processing apparatus, a control method, an information processing terminal, and an information processing method. In particular, the present technology relates to an information processing apparatus, a control method, an information processing terminal, and an information processing method capable of detecting a voice to be recognized by using a microphone in accordance with a user's intention.

BACKGROUND ART

In recent years, television receivers (TVs) equipped with a voice assistant function have been sold. The voice assistant function allows a device to be operated by voice.

A user can use the voice assistant function to, for example, operate a TV, search for a television program, or search for a video streamed by a video streaming service by uttering a keyword or the like.

CITATION LIST

Patent Document

Patent Document 1: Japanese Patent Application Laid-Open No. 2018-117311

SUMMARY OF THE INVENTION

Problems to be Solved by the Invention

In a case of using a voice assistant function, a user presses a microphone button provided on a remote controller, and then makes an utterance. The user's utterance is detected by a microphone provided in the remote controller, and then transmitted to a TV.

Some TV models have a microphone mounted on a main body of the TV. In this case, it is necessary to appropriately switch whether a user's voice is detected by the microphone provided in the main body or the microphone provided in the remote controller.

The present technology has been made in view of such a situation, and makes it possible to detect a voice to be recognized by using a microphone in accordance with a user's intention.

Solutions to Problems

The information processing apparatus according to a first aspect of the present technology includes: a main body microphone that is a microphone provided in a housing; and a control unit that controls which of the main body microphone or a terminal microphone that is a microphone provided in an information processing terminal used for a user's operation is to be used to detect a voice to be recognized, on the basis of a state of the user's operation on the information processing terminal.

According to the first aspect of the present technology, which of the main body microphone or the terminal microphone that is the microphone provided in the information processing terminal used for the user's operation is to be used to detect the voice to be recognized is controlled on the basis of the state of the user's operation on the information processing terminal.

An information processing terminal according to a second aspect of the present technology includes: a terminal microphone that is a microphone provided in a housing; an operation unit that is used for operating an information processing apparatus and includes a predetermined button operated when the terminal microphone is used to detect a voice to be recognized; and a communication unit that transmits the voice detected by the terminal microphone to the information processing apparatus in response to a detection request being transmitted from the information processing apparatus that controls, on the basis of a state of a user's operation on the predetermined button, which of the terminal microphone or a microphone included in the information processing apparatus is to be used to detect the voice to be recognized.

According to the second aspect of the present technology, the voice detected by the terminal microphone is transmitted to the information processing apparatus in response to the detection request being transmitted from the information processing apparatus that controls, on the basis of the state of the user's operation on the predetermined button, which of the terminal microphone or the microphone included in the information processing apparatus is to be used to detect the voice to be recognized.

BRIEF DESCRIPTION OF DRAWINGS

FIG. 13 is a diagram illustrating an example of another information processing terminal.

FIG. 14 is a diagram illustrating an example of a screen display.

MODE FOR CARRYING OUT THE INVENTION

Modes for carrying out the present technology will be described below. The description will be made in the order below.

1. Voice recognition function of TV
2. Application structure
3. Configuration and operation of TV
4. Modified example <<Voice Recognition Function of TV>>

Figure 1:
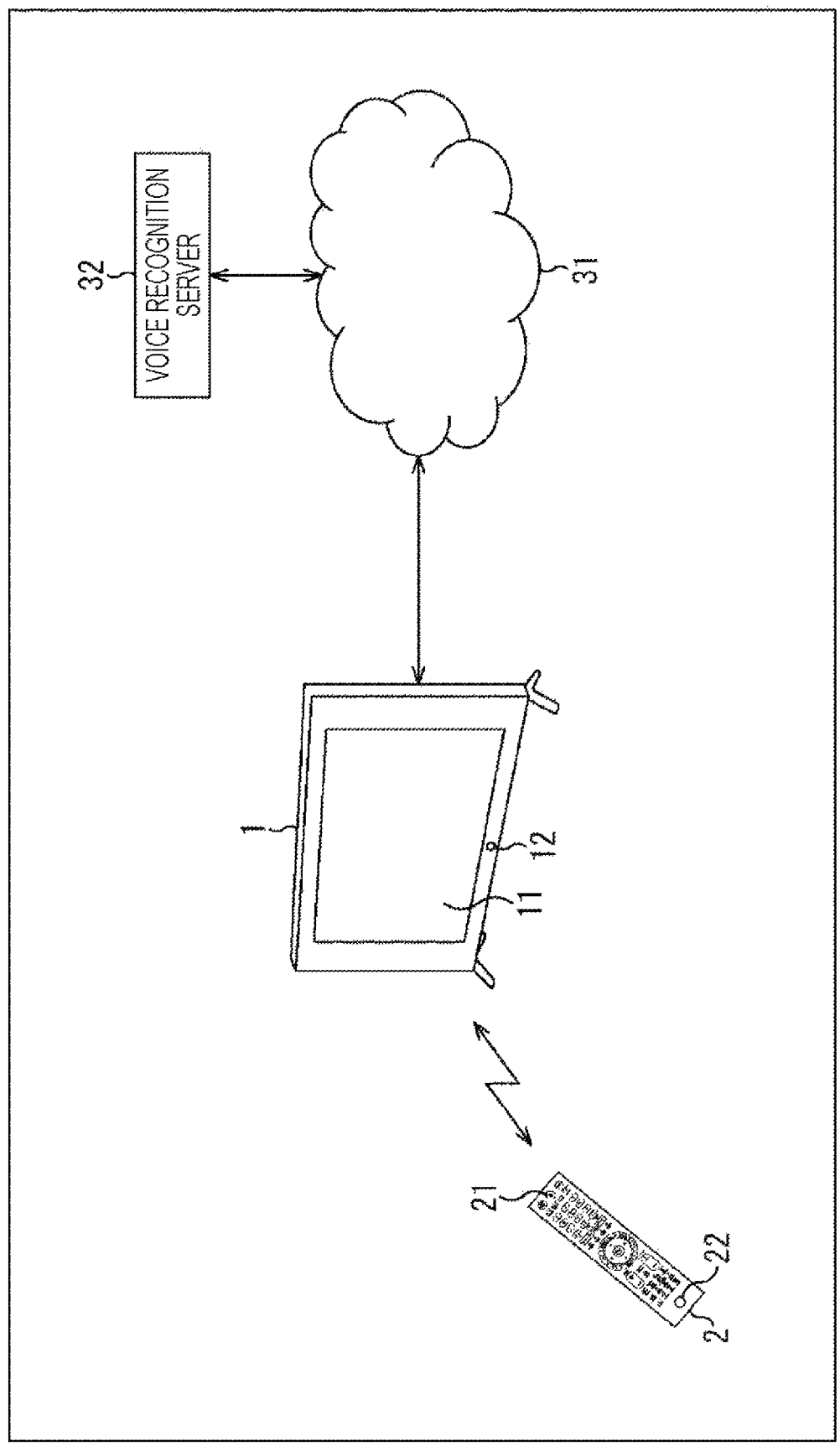
FIG. 1 is a diagram illustrating voice recognition by a TV according to one embodiment of the present technology.

FIG. 1 is a diagram illustrating voice recognition by a TV according to one embodiment of the present technology.

As illustrated in FIG. 1, a display 11 is provided on a front surface of a housing of a TV 1, and a microphone 12 is provided under the display 11. The microphone 12 is used, for example, to detect a user's voice.

The TV 1 is equipped with a voice assistant function. A user can perform various operations of the TV 1 by voice, such as searching for a television program, searching for a video streamed by a video streaming service, searching for a website, changing a setting, and switching channels. It is also possible to use voice to perform, for example, operation on an external device connected to the TV 1.

Audio data representing a voice detected by the microphone 12 is transmitted to a voice recognition server 32 via the Internet 31. The voice recognition server 32 performs voice recognition, and information representing a voice recognition result is transmitted to the TV 1.

The TV 1 receives the information transmitted from the voice recognition server 32, and performs processing in accordance with the voice recognition result.

The TV 1 that can be operated with the use of voice in this way is also provided with a remote controller 2 as an information processing terminal used for operating the TV 1. The user can also operate the TV 1 by using the remote controller 2.

The remote controller 2 has a housing that the user can hold with one hand. Examples of the shape of the housing include an elongated shape and a rectangular parallelepiped shape. Various buttons such as a power button, a volume button, a channel button, a cursor button, and an enter button are provided on the surface of the housing of the remote controller 2. A signal representing a content of a user's operation is transmitted to the TV 1 by infrared communication or wireless communication using radio waves such as Bluetooth (registered trademark) or wireless LAN.

The remote controller 2 is provided with a microphone 22. The user can input voice using the microphone 22 by pressing a microphone button 21 provided together with other buttons.

Audio data representing the voice detected by the microphone 22 is transmitted to the TV 1, and is subjected to processing similar to that for a voice detected by the microphone 12. The audio data transmitted from the remote controller 2 is transmitted from the TV 1 to the voice recognition server 32, and is subjected to voice recognition in the voice recognition server 32.

The remote controller 2 is an external device for the TV 1. The TV 1 is provided with two microphones, the microphone 12 provided in the main body and the microphone 22 provided in the external device for the TV 1, as microphones for inputting a voice.

Hereinafter, the microphone 12 provided in the main body of the TV 1 is appropriately referred to as a main body microphone. Furthermore, the microphone 22 provided in the remote controller 2 is referred to as a remote control microphone.

Figure 2:
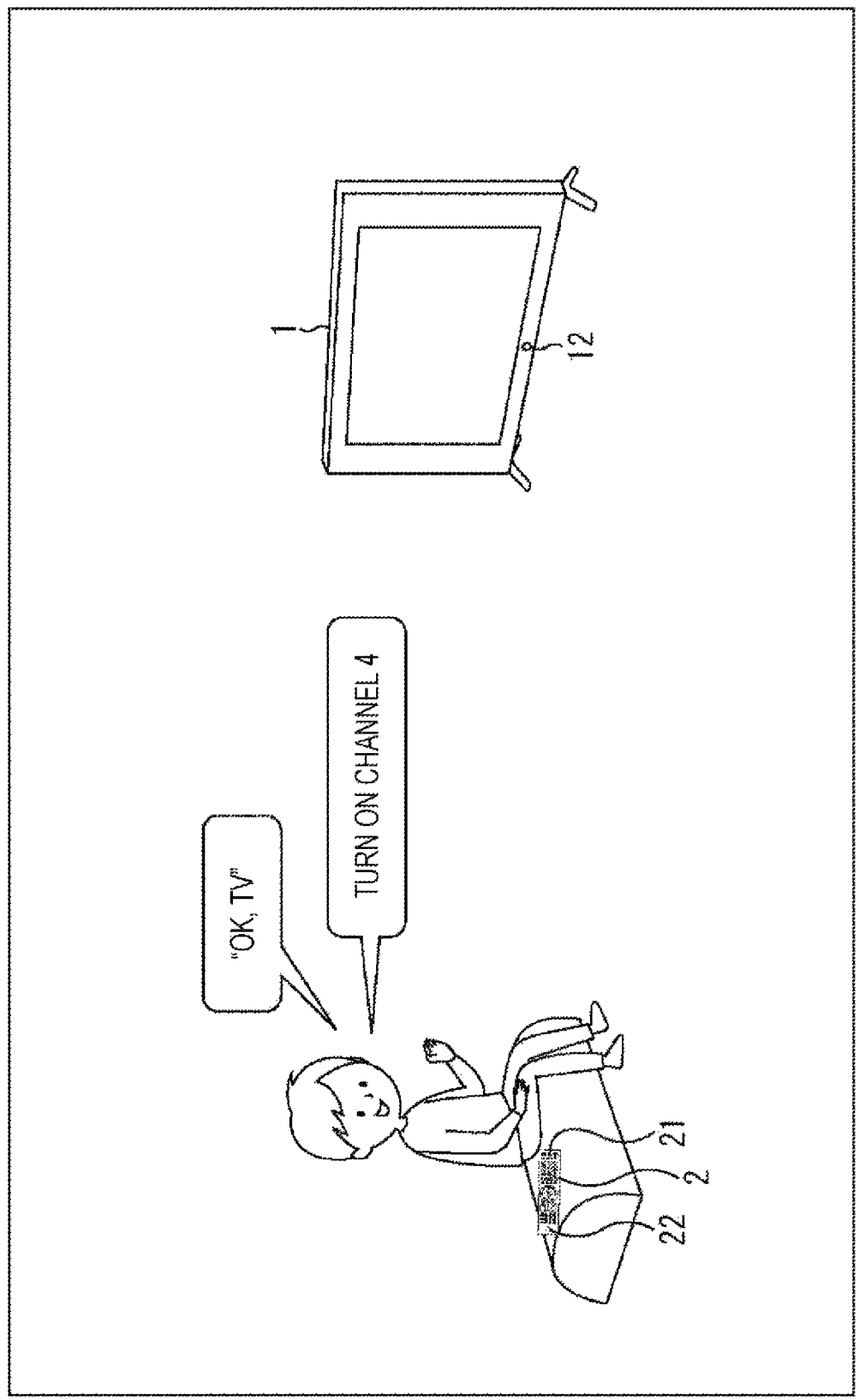
FIG. 2 is a diagram illustrating an example of an operation with the use of a main body microphone.

FIG. 2 is a diagram illustrating an example of an operation with the use of the main body microphone.

As illustrated in a balloon in FIG. 2, a user can use the voice assistant function by uttering a wake word. In the example in FIG. 2, "OK, TV" is set as the wake word.

A user's utterance after the wake word is detected by the main body microphone, and is subjected to voice recognition. In the example in FIG. 2, the user utters "Turn on Channel 4".

Audio data representing the voice "Turn on Channel 4" detected by the main body microphone is transmitted to the voice recognition server 32. On the basis of a result of voice recognition by the voice recognition server 32, the TV 1 performs an operation of switching the channel to be received to Channel 4.

In this way, the user can start the voice assistant function by uttering the wake word, and can perform various operations by inputting a voice to the main body microphone without using the remote controller 2. In the example in FIG. 2, the remote controller 2 is placed next to the user.

Figure 3:
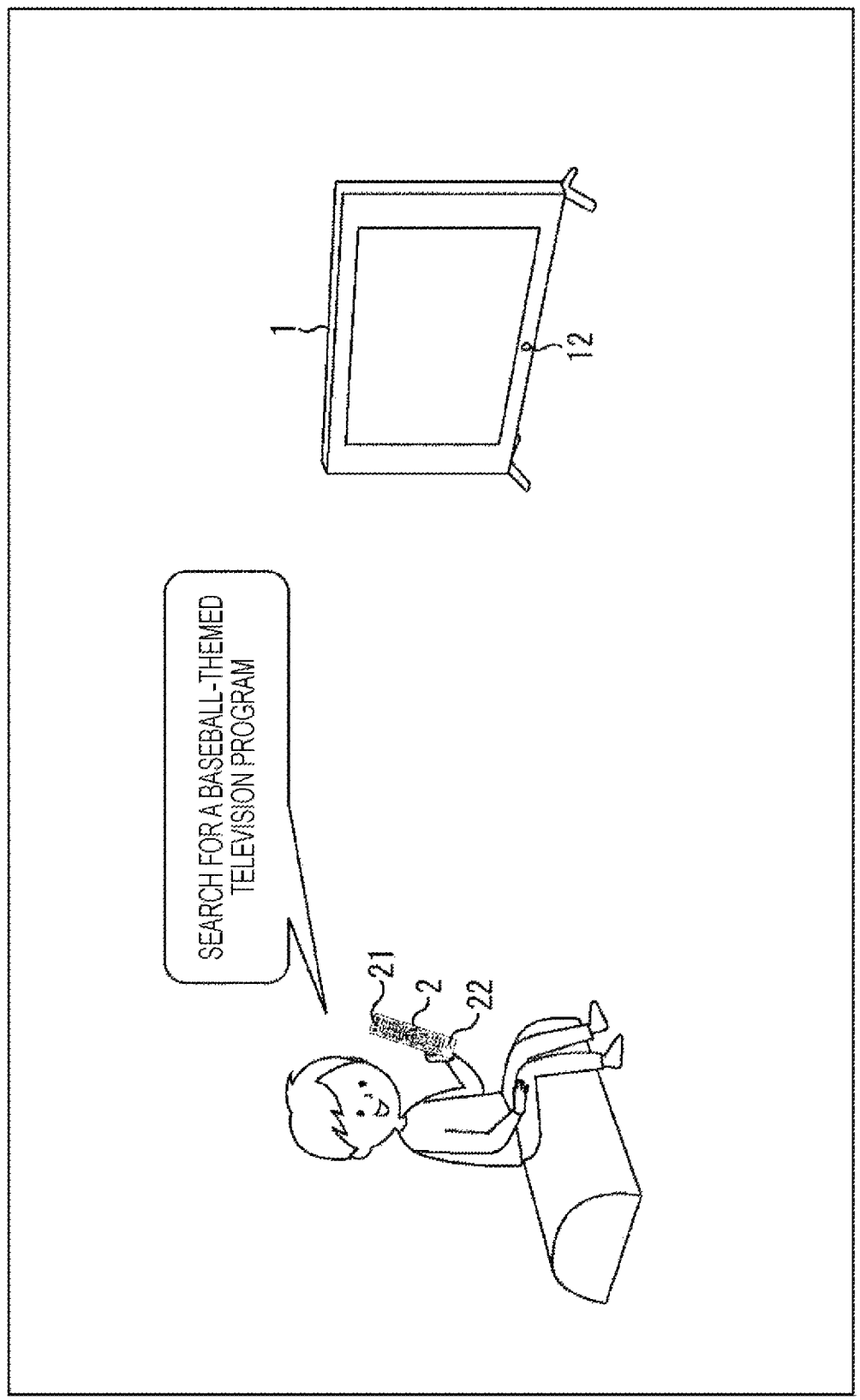
FIG. 3 is a diagram illustrating an example of an operation with the use of a remote control microphone.

FIG. 3 is a diagram illustrating an example of an operation with the use of the remote control microphone.

Since an operation can be performed after the microphone button 21 has been pressed, in a case of performing an operation with the use of the remote control microphone, a user performs the operation while holding the remote controller 2 as illustrated in FIG. 3.

Figure 4:
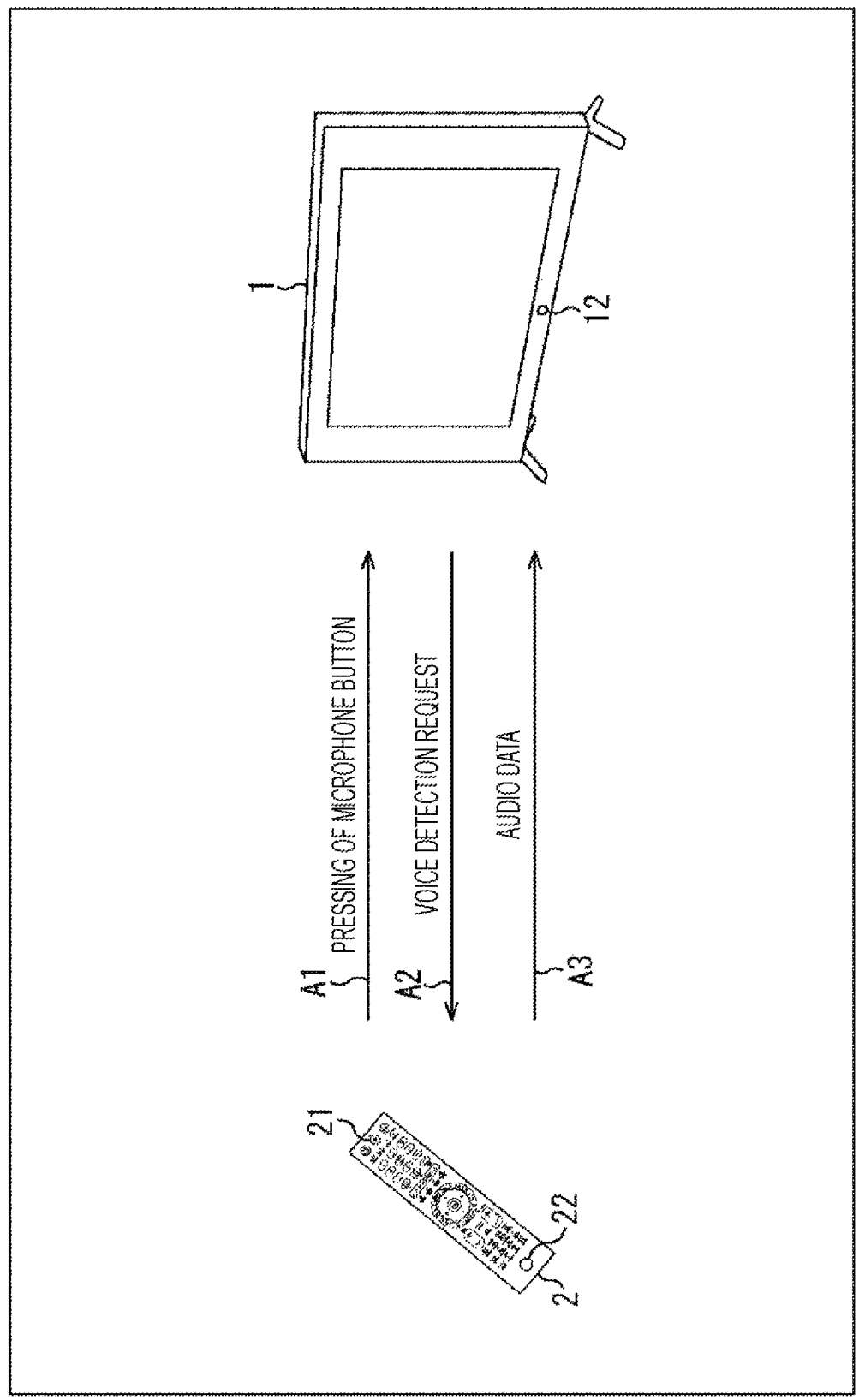
FIG. 4 is a diagram illustrating an example of interaction after a microphone button has been pressed.

FIG. 4 is a diagram illustrating an example of interaction after the microphone button 21 has been pressed.

When the microphone button 21 is pressed, as indicated by an arrow A1, information indicating that the microphone button 21 has been pressed is transmitted from the remote controller 2 to the TV 1.

As indicated by an arrow A2, a voice detection request, which is a request to start voice detection, is transmitted from the TV 1 that has received the information indicating that the microphone button 21 has been pressed, to the remote controller 2.

The remote controller 2 that has received the voice detection request performs voice detection by the remote control microphone. Audio data representing a user's voice detected by the remote control microphone is transmitted to the TV 1 as indicated by an arrow A3.

Note that the transmission of the voice detection request from the TV 1 to the remote controller 2 and the transmission of the audio data from the remote controller 2 to the TV 1 are performed by wireless communication using radio waves.

Furthermore, the transmission from the remote controller 2 to the TV 1 of the information indicating that the microphone button 21 has been pressed is performed by infrared communication or wireless communication using radio waves.

Returning to the description of FIG. 3, a user's utterance after the microphone button 21 has been pressed is detected by the remote control microphone and is subjected to voice recognition. In the example in FIG. 3, the user utters "Search for a baseball-themed television program".

Audio data representing the voice "Search for a baseball-themed television program" detected by the remote control microphone is transmitted to the voice recognition server 32 via the TV 1. On the basis of a result of voice recognition by the voice recognition server 32, the TV 1 performs an operation of searching for a baseball-themed television program.

In this way, the user can enable the remote control microphone by pressing the microphone button 21, and perform various operations by inputting a voice to the remote control microphone.

Figure 5:
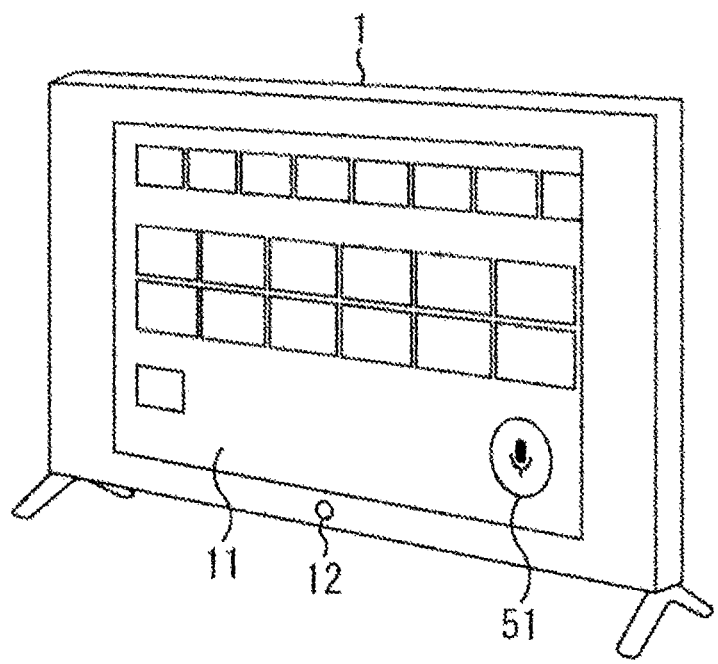
FIG. 5 is a diagram illustrating an example of a TV display screen.

FIG. 5 is a diagram illustrating an example of a display screen of the TV 1.

In the example in FIG. 5, a television program guide application is activated, and a screen of the television program guide application is displayed on the display 11. A thumbnail image of a television program or the like is displayed in each of tile-shaped regions. By moving a cursor displayed on the screen, a user can select a predetermined television program and display detailed information.

As will be described later, various applications are installed on the TV 1, which is a device equipped with a general-purpose operating system (OS). The display 11 displays a screen of an active application among running applications.

As illustrated at the lower right, a voice recognition icon 51 is displayed on the screen of the television program guide application. The voice recognition icon 51 is an image that is operated when voice recognition is performed.

The user can operate, for example, the cursor button of the remote controller 2 to move the cursor to the voice recognition icon 51 and then press the enter button to allow for voice input. In this way, the user can also allow for voice input by operating a display of a graphical user interface (GUI) for voice recognition such as the voice recognition icon 51.

A user's utterance after the voice recognition icon 51 has been operated is detected by the main body microphone and is subjected to voice recognition. That is, the remote control microphone is not enabled.

Figure 6:
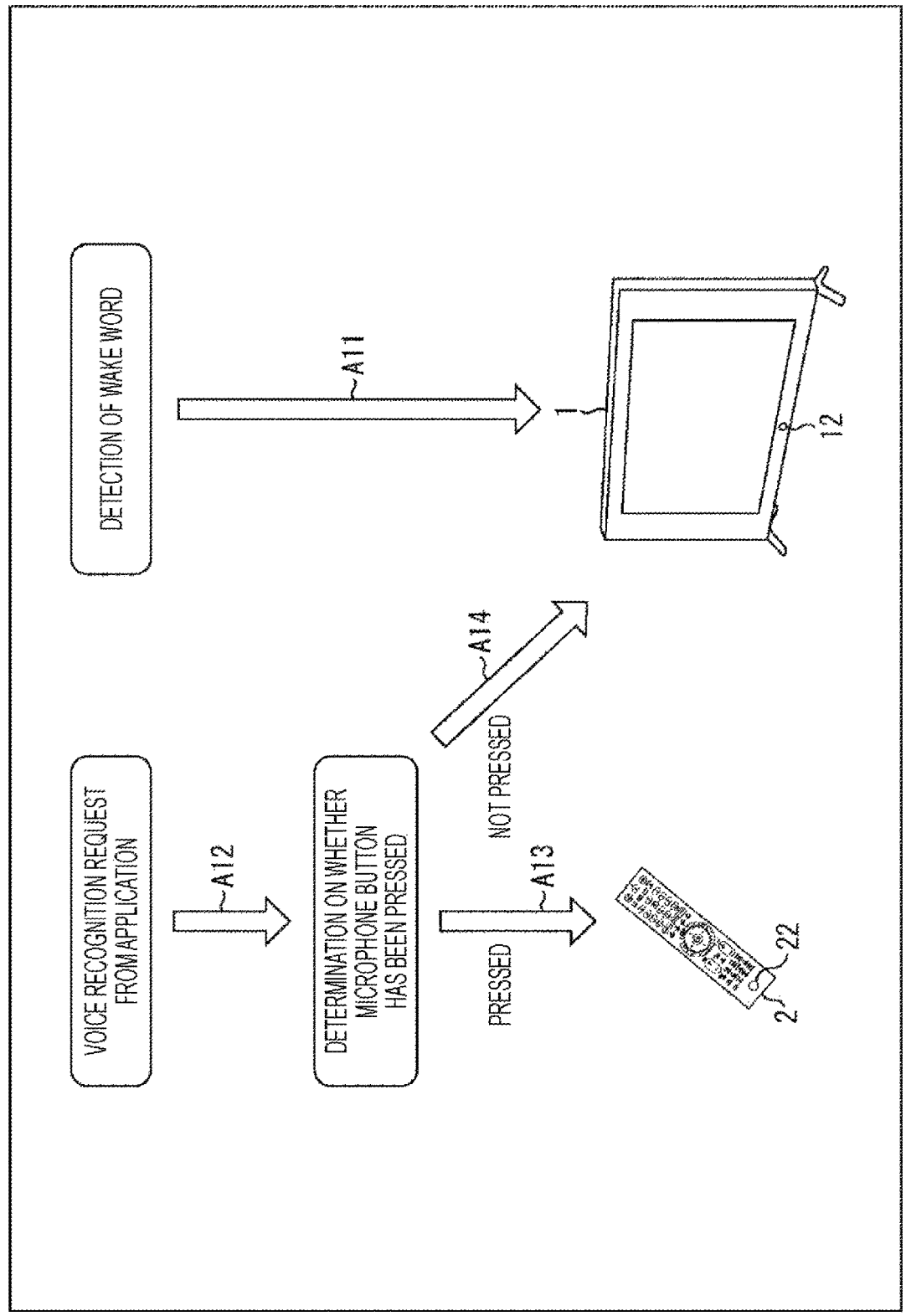
FIG. 6 is a diagram illustrating an example of switching between microphones to be used for voice detection.

FIG. 6 is a diagram illustrating an example of switching between microphones to be used for voice detection.

As illustrated on the right side of FIG. 6, in a case where it has been detected that a user has uttered the wake word, a voice after that is detected by the main body microphone provided in the TV 1 as pointed by an arrow A11.

As illustrated on the left side in FIG. 6, in a case where a voice recognition request has been output from an application, it is determined whether or not the user has pressed the microphone button 21 as pointed by an arrow A12.

The voice recognition request from the application is output from, for example, an active application when the microphone button 21 is pressed by the user or when the display of the GUI for voice recognition is operated by the user.

A microphone button pressing determination, which is a determination on whether or not the microphone button 21 has been pressed, is performed by a program module that has received the voice recognition request output from the application. The program module that performs the microphone button pressing determination is provided, for example, as a part of the OS or as a driver.

In a case where it is determined as a result of the microphone button pressing determination that the microphone button 21 has been pressed by the user, the remote control microphone provided in the remote controller 2 is enabled as pointed by an arrow A13, and a voice after that is detected by the remote control microphone. A voice detected by the remote control microphone is subjected to voice recognition.

On the other hand, in a case where it is determined as a result of the microphone button pressing determination that the microphone button 21 has not been pressed by the user, that is, in a case where the voice recognition request from the application has been output in response to an operation on the display of the GUI for voice recognition, a voice after that is detected by the main body microphone as pointed by an arrow A14.

In this way, as an operation performed by a user to allow for voice input, three types of operations are available: an operation of pressing the microphone button 21, an operation of uttering the wake word, and an operation with the use of the display of the GUI for voice recognition.

The TV 1 allows the remote control microphone to detect a voice only in a case where the operation of pressing the microphone button 21 is performed, and allows the main body microphone to detect a voice in a case where the other two operations are performed.

The operation of pressing the microphone button 21 includes holding the remote controller 2 in hand and visually checking the microphone button 21, and it is therefore considered that the user has an intention to input a voice through the remote control microphone provided in the remote controller 2.

The operation of allowing the remote control microphone to detect a voice that is performed by the TV 1 in a case where the operation of pressing the microphone button 21 can be said to be an operation of using a microphone in accordance with the user's intention.

On the other hand, the operation of uttering the wake word is mainly performed with a face turned to the TV 1, and it is therefore considered that the user has an intention to input a voice through the main body microphone. In a similar manner, the operation with the use of the display of the GUI for voice recognition includes looking at the screen of the TV 1, and it is therefore considered that the user has an intention to input a voice through the main body microphone.

It can be said that the operation of allowing the main body microphone to detect a voice that is performed by the TV 1 in a case where the operation of uttering the wake word or the operation with the use of the display of the GUI for voice recognition is performed is also an operation of using a microphone in accordance with the user's intention.

A series of processing of the TV 1 for switching between microphones to be used for voice detection as described above will be described later.

<<Application Structure>>

Figure 7:
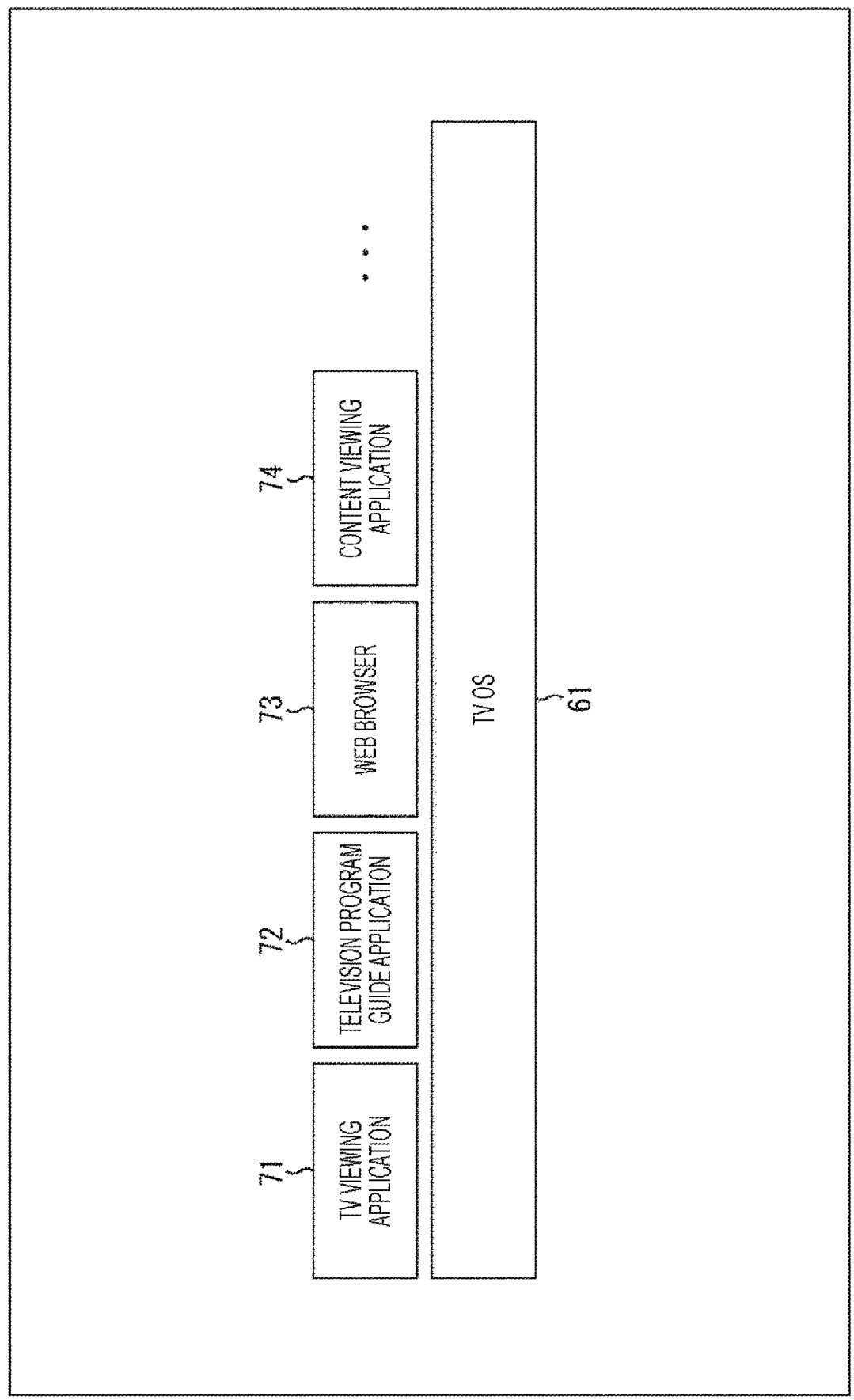
FIG. 7 is a diagram illustrating an example of a TV application structure.

FIG. 7 is a diagram illustrating an example of an application structure of the TV 1.

The TV 1 is equipped with a TV OS 61. Various applications that run on the TV OS 61 are installed on the TV 1. In the example in FIG. 7, a TV viewing application 71, a television program guide application 72, a Web browser 73, and a content viewing application 74 are illustrated.

The TV viewing application 71 manages viewing of broadcast television programs. While the TV viewing application 71 is running, a user can select a predetermined channel by operating the remote controller 2 or the like to view a television program broadcast on the selected channel.

The television program guide application 72 manages a television program guide, which is a list of television programs scheduled to be broadcast. While the television program guide application 72 is running, the user can switch the display of a television program guide screen displayed on the display 11 by operating the remote controller 2 or the like.

The Web browser 73 is an application used to obtain a connection to the Internet 31 and browse a Web page or the like. While the Web browser 73 is running, the user can browse a predetermined Web page by operating the remote controller 2 or the like.

The content viewing application 74 is an application for using a streaming service provided by a streaming server (not illustrated).

For example, when the content viewing application 74 is started, the TV 1 displays a main screen of the streaming service on the basis of information transmitted from the streaming server. Information regarding content available for viewing, such as titles and thumbnail images, is displayed on the main screen. The user can select a piece of desired content by operating the remote controller 2 or the like. When the user selects a predetermined piece of content, the content starts to be streamed.

Various applications as described above are installed on the TV 1. For example, in a case where the display of the GUI for voice recognition is operated, a voice recognition request is output from a running application. The TV 1 is also provided with a program module that switches between microphones in response to the voice recognition request output from the application.

<<Configuration and Operation of TV>>

<Configuration of TV>

Figure 8:
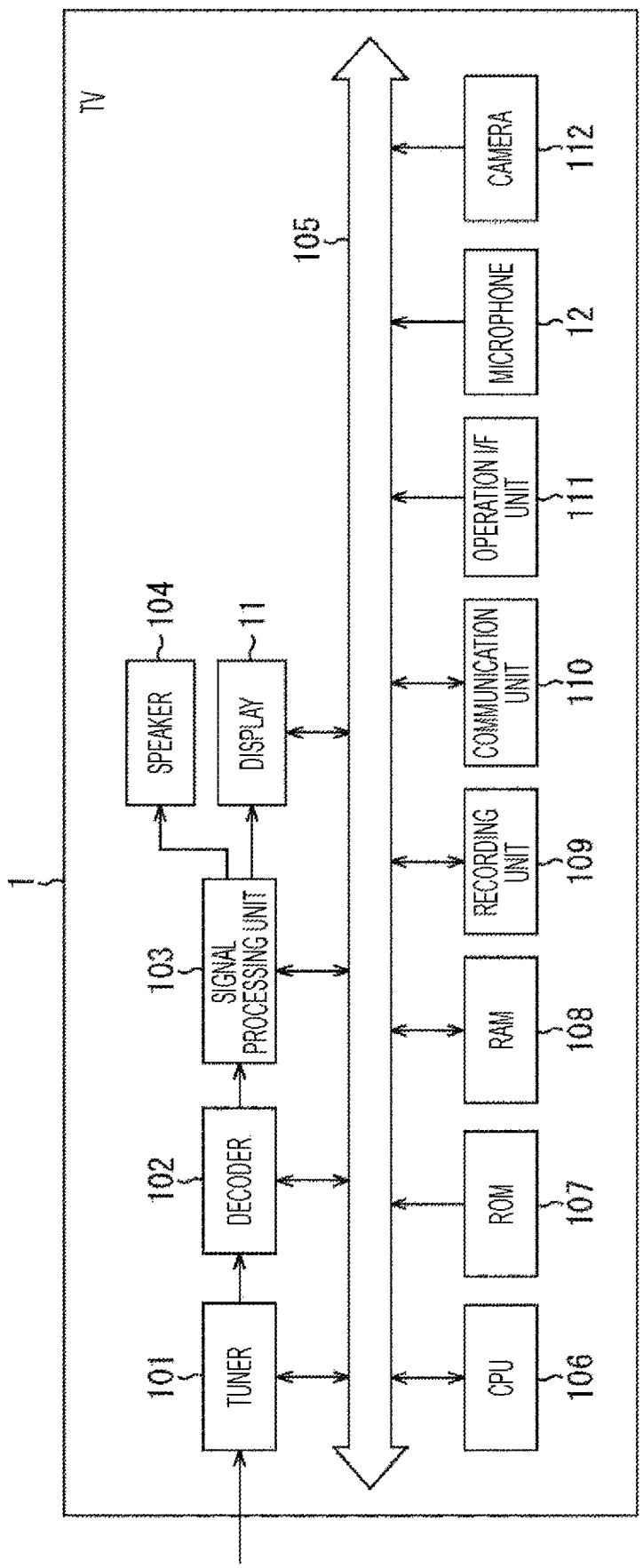
FIG. 8 is a block diagram illustrating an example of a TV hardware configuration.

FIG. 8 is a block diagram illustrating an example of a hardware configuration of the TV 1.

In the configuration illustrated in FIG. 8, components that have been described above are designated by the same reference numerals. Duplicate descriptions will be omitted as appropriate.

A tuner 101 receives a broadcast wave signal supplied from an antenna (not illustrated) or a broadcast wave signal supplied from a set-top box for satellite broadcasting or cable television, and extracts a signal of a channel selected by a user. The tuner 101 performs various types of processing such as A/D conversion and demodulation on the extracted signal, and outputs, to a decoder 102, television program data acquired by the various types of processing.

The decoder 102 decodes a video stream constituting the television program data, and outputs data of each picture obtained by decoding to a signal processing unit 103. Furthermore, the decoder 102 decodes an audio stream constituting the television program data, and outputs audio data of the television program to the signal processing unit 103.

In a case where content of a predetermined streaming service is reproduced, the decoder 102 decodes a video stream and an audio stream of the content received by a communication unit 110 and supplied via a bus 105. The decoder 102 outputs, to the signal processing unit 103, data of each picture obtained by decoding of the video stream of the content and audio data obtained by decoding of the audio stream.

The signal processing unit 103 adjusts an image quality of each picture supplied from the decoder 102 under the control of a CPU 106. The signal processing unit 103 outputs the picture in which the image quality has been adjusted to the display 11 to cause a video of a television program or content to be displayed.

Furthermore, the signal processing unit 103 performs digital-to-analog conversion or the like on the audio data supplied from the decoder 102, and causes a speaker 104 to output sound of the television program or the content in synchronization with the video.

The display 11 is constituted by a liquid crystal display (LCD), an organic EL display, or the like.

The central processing unit (CPU) 106, a read only memory (ROM) 107, and a random access memory (RAM) 108 are connected to each other by the bus 105. The CPU 106 uses the RAM 108 to execute a program recorded in the ROM 107 or a recording unit 109, and controls the entire operation of the TV 1.

The recording unit 109 is constituted by a recording medium such as a hard disk drive (HDD) or a solid state drive (SSD). The recording unit 109 records various types of data such as television program data, content, EPG data, and programs.

The communication unit 110 is an interface for the Internet 31. The communication unit 110 communicates with the voice recognition server 32.

An operation I/F unit 111 receives information transmitted from the remote controller 2 by infrared communication. Furthermore, the operation I/F unit 111 communicates with the remote controller 2 by wireless communication using radio waves. Information such as audio data transmitted from the remote controller 2 and received by the operation I/F unit 111 is output to the CPU 106 via the bus 105. The operation I/F unit 111 functions as a communication unit that communicates with the remote controller 2.

A camera 112 appropriately images a situation in front of the TV 1.

Figure 9:
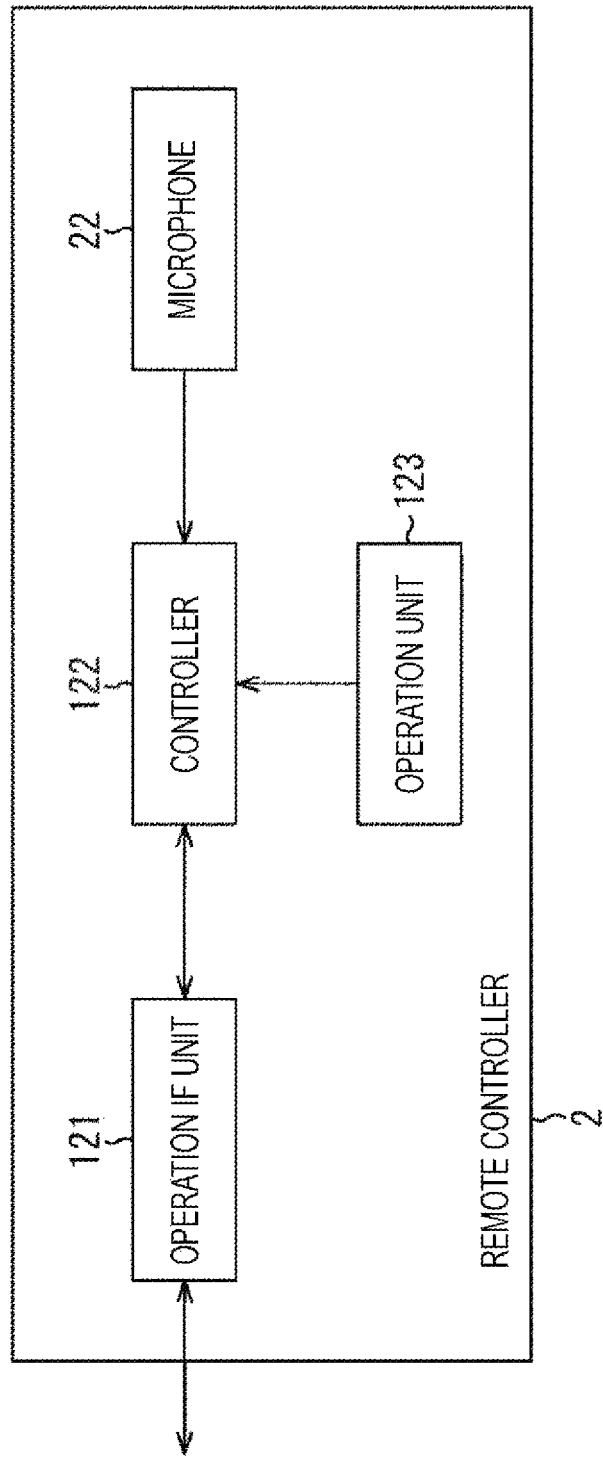
FIG. 9 is a block diagram illustrating a configuration example of a remote controller.

FIG. 9 is a block diagram illustrating a configuration example of the remote controller 2.

An operation I/F unit 121 transmits information to the TV 1 by infrared communication. Furthermore, the operation I/F unit 121 communicates with the TV 1 by wireless communication using radio waves. Information received by the operation I/F unit 121 is output to a controller 122.

The controller 122 is constituted by a CPU, a ROM, and a RAM. The controller 122 executes a predetermined program, and controls the entire remote controller 2. The controller 122 transmits, to the TV 1 via the operation I/F unit 121, audio data representing a voice detected by the microphone 22 or information representing a content of a user's operation supplied from an operation unit 123.

The microphone 22 detects a user's voice, and outputs audio data representing the detected voice to the controller 122.

The operation unit 123 detects an operation by the user, and outputs information representing a content of the detected operation to the controller 122.

Figure 10:
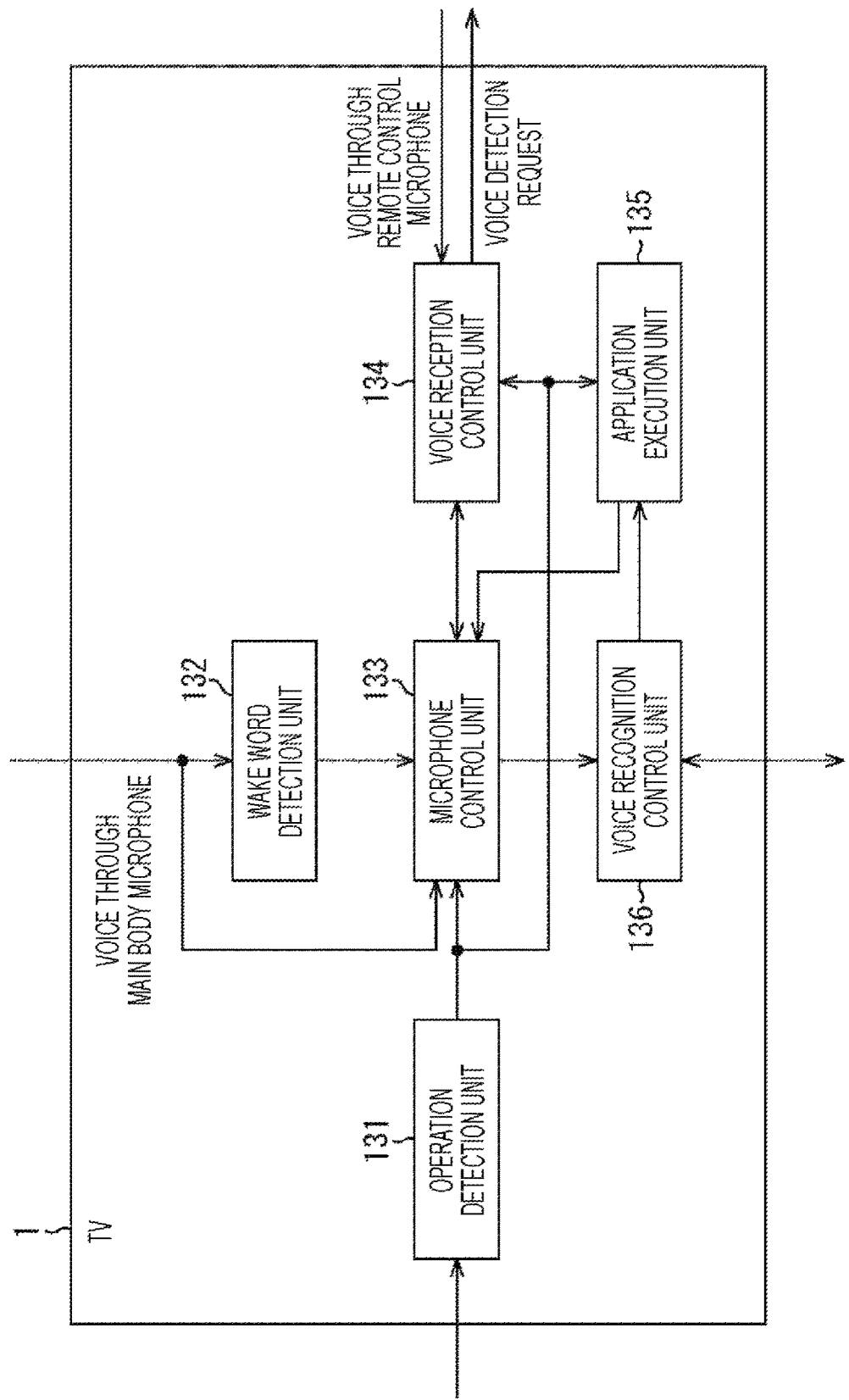
FIG. 10 is a block diagram illustrating a functional configuration example of the TV.

FIG. 10 is a block diagram illustrating a functional configuration example of the TV 1.

At least one of functional units illustrated in FIG. 10 is implemented by the CPU 106 in FIG. 8 executing various programs including the TV OS 61.

As illustrated in FIG. 10, an operation detection unit 131, a wake word detection unit 132, a microphone control unit 133, a voice reception control unit 134, an application execution unit 135, and a voice recognition control unit 136 are implemented in the TV 1. Audio data representing a voice detected by the main body microphone constituted by the microphone 12 is input to the wake word detection unit 132 and the microphone control unit 133.

The operation detection unit 131 controls the operation I/F unit 111 to detect a user's operation performed with the use of the remote controller 2. Various operations such as pressing the microphone button 21 and moving a cursor displayed on the screen are detected by the operation detection unit 131. Information representing a content of the user's operation detected by the operation detection unit 131 is supplied to the microphone control unit 133, the voice reception control unit 134, and the application execution unit 135.

The wake word detection unit 132 detects an utterance of the wake word on the basis of audio data supplied from the main body microphone. In a case where it is detected that a user has uttered the wake word, the wake word detection unit 132 outputs information indicating that fact to the microphone control unit 133.

The microphone control unit 133 switches between microphones to be used for detecting a voice to be subjected to voice recognition. For example, in a case where it is detected that the wake word has been uttered, the microphone control unit 133 outputs the voice detected by the main body microphone to the voice recognition control unit 136 as a voice recognition target.

Furthermore, in a case where a voice recognition request has been supplied from the application execution unit 135 in response to an operation on the display of the GUI for voice recognition, the microphone control unit 133 outputs the voice detected by the main body microphone to the voice recognition control unit 136 as a voice recognition target.

Note that a voice detected by the main body microphone is not always recorded. In a case where a wake word detection setting has been enabled, a voice detected by the main body microphone is always recorded. In a case where the setting has been disabled, a voice is not recorded. In a case where the display of the GUI for voice recognition is operated, a request is made to the main body microphone. In response to the request, a voice detected by the main body microphone is supplied to the microphone control unit 133 without passing through the wake word detection unit 132.

In a case where a voice recognition request has been supplied from the application execution unit 135 in response to pressing of the microphone button 21, the microphone control unit 133 enables the remote control microphone and outputs information indicating that fact to the voice reception control unit 134. The microphone control unit 133 outputs, to the voice recognition control unit 136, audio data supplied from the voice reception control unit 134 as a voice recognition target after the remote control microphone has been enabled.

The voice reception control unit 134 controls the operation I/F unit 111 to control detection of voice by the remote control microphone. For example, in a case where information indicating that the remote control microphone is to be enabled has been supplied from the microphone control unit 133, the voice reception control unit 134 transmits a voice detection request to the remote controller 2.

Furthermore, the voice reception control unit 134 receives audio data transmitted from the remote controller 2 after the voice detection request has been transmitted, and outputs the audio data to the microphone control unit 133.

The application execution unit 135 controls execution of an application in accordance with a user's operation represented by information supplied from the operation detection unit 131.

For example, in a case where the display of the GUI for voice recognition is operated with a predetermined application activated, the application execution unit 135 outputs a voice recognition request to the microphone control unit 133.

Furthermore, the application execution unit 135 controls execution of an application on the basis of a result of voice recognition supplied from the voice recognition control unit 136.

The voice recognition control unit 136 controls the communication unit 110 to communicate with the voice recognition server 32, and controls a voice recognition function in the TV 1. The voice recognition control unit 136 transmits, to the voice recognition server 32, audio data supplied from the microphone control unit 133.

Furthermore, the voice recognition control unit 136 receives a result of voice recognition transmitted from the voice recognition server 32. The result of voice recognition received by the voice recognition control unit 136 is output to the application execution unit 135.

<Operation of TV>

Figure 11:
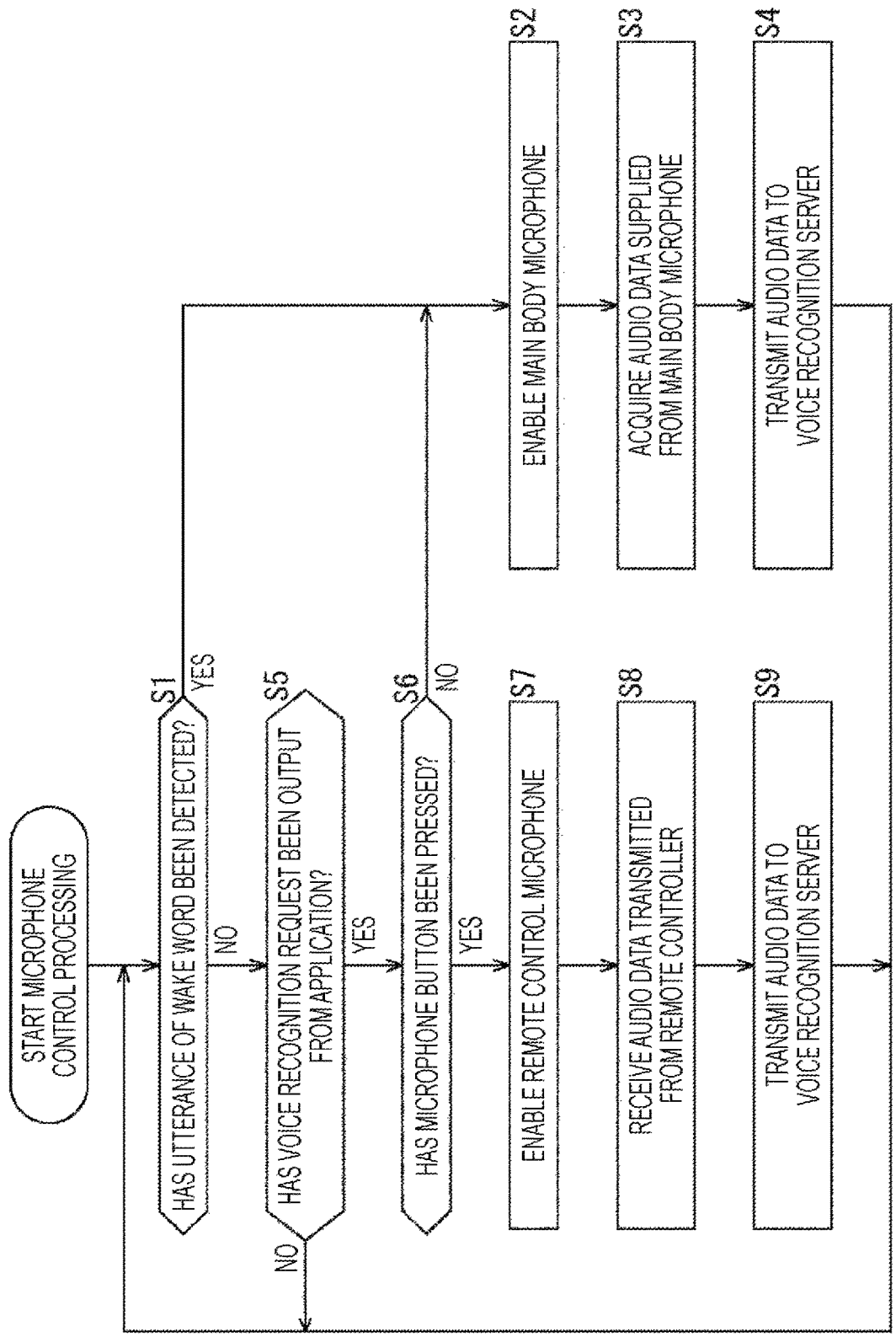
FIG. 11 is a flowchart illustrating microphone control processing of the TV.

Here, microphone control processing by the TV 1 having the configuration as described above will be described with reference to a flowchart in FIG. 11.

In step S1, the wake word detection unit 132 of the TV 1 determines whether or not an utterance of the wake word has been detected on the basis of audio data supplied from the main body microphone.

If it is determined in step S1 that an utterance of the wake word has been detected, the microphone control unit 133 enables the main body microphone in step S2. Note that, in a case where the wake word detection setting has been enabled, the main body microphone has already been enabled, so here, the main body microphone continues to be enabled.

In step S3, the microphone control unit 133 acquires the audio data supplied from the main body microphone as a voice recognition target. The audio data acquired by the microphone control unit 133 is supplied to the voice recognition control unit 136.

In step S4, the voice recognition control unit 136 transmits, to the voice recognition server 32, the audio data supplied from the microphone control unit 133.

In the voice recognition server 32, the voice detected by the main body microphone is subjected to voice recognition, and a result of the voice recognition is transmitted to the TV 1. The result of voice recognition transmitted from the voice recognition server 32 is received by the voice recognition control unit 136 and output to the application execution unit 135.

On the other hand, if it is determined in step S1 that an utterance of the wake word has not been detected, in step S5, the microphone control unit 133 determines whether or not a voice recognition request has been output from an application executed by the application execution unit 135.

If it is determined in step S5 that a voice recognition request has been output, in step S6, the microphone control unit 133 determines whether or not the microphone button 21 has been pressed on the basis of information supplied from the operation detection unit 131.

If it is determined in step S6 that the microphone button 21 has not been pressed, the processing proceeds to step S2, and processing similar to the processing described above is performed. That is, the main body microphone is enabled, and the main body microphone is used to detect a user's voice.

If it is determined in step S6 that the microphone button 21 has been pressed, in step S7, the microphone control unit 133 enables the remote control microphone. The voice reception control unit 134 transmits a voice detection request to the remote controller 2.

In step S8, the voice reception control unit 134 receives audio data transmitted from the remote controller 2 after the voice detection request has been transmitted, and outputs the audio data to the microphone control unit 133. The microphone control unit 133 outputs, to the voice recognition control unit 136, the audio data supplied from the voice reception control unit 134 as a voice recognition target.

In step S9, the voice recognition control unit 136 transmits, to the voice recognition server 32, the audio data supplied from the microphone control unit 133.

In the voice recognition server 32, the voice detected by the remote control microphone is subjected to voice recognition, and a result of the voice recognition is transmitted to the TV 1. The result of voice recognition transmitted from the voice recognition server 32 is received by the voice recognition control unit 136 and output to the application execution unit 135.

After the audio data has been transmitted in step S4 or step S9, or if it is determined in step S5 that a voice recognition request has not been output, the processing returns to step S1 and the processing described above is repeated.

By the processing described above, the TV 1 can detect a user's voice by using a microphone in accordance with a user's intention. By selecting the microphone in accordance with the user's intention, the TV 1 can catch and respond to the user's voice more accurately.

That is, in a case where the user presses the microphone button 21 with the intention of using the remote control microphone to input a voice, the TV 1 can use the remote control microphone to detect the user's voice.

Furthermore, in a case where the user utters the wake word or operates the display of the GUI for voice recognition with the intention of using the main body microphone to input a voice, the TV 1 can use the main body microphone to detect the user's voice.

This also allows the user to input a voice from a microphone in accordance with the user's intention.

Modified Example

<Example of Information Processing Terminal>

The remote controller 2 has been described as the information processing terminal used to operate the TV 1. Alternatively, the information processing terminal may be another device such as a smartphone or a tablet terminal.

Figure 12:
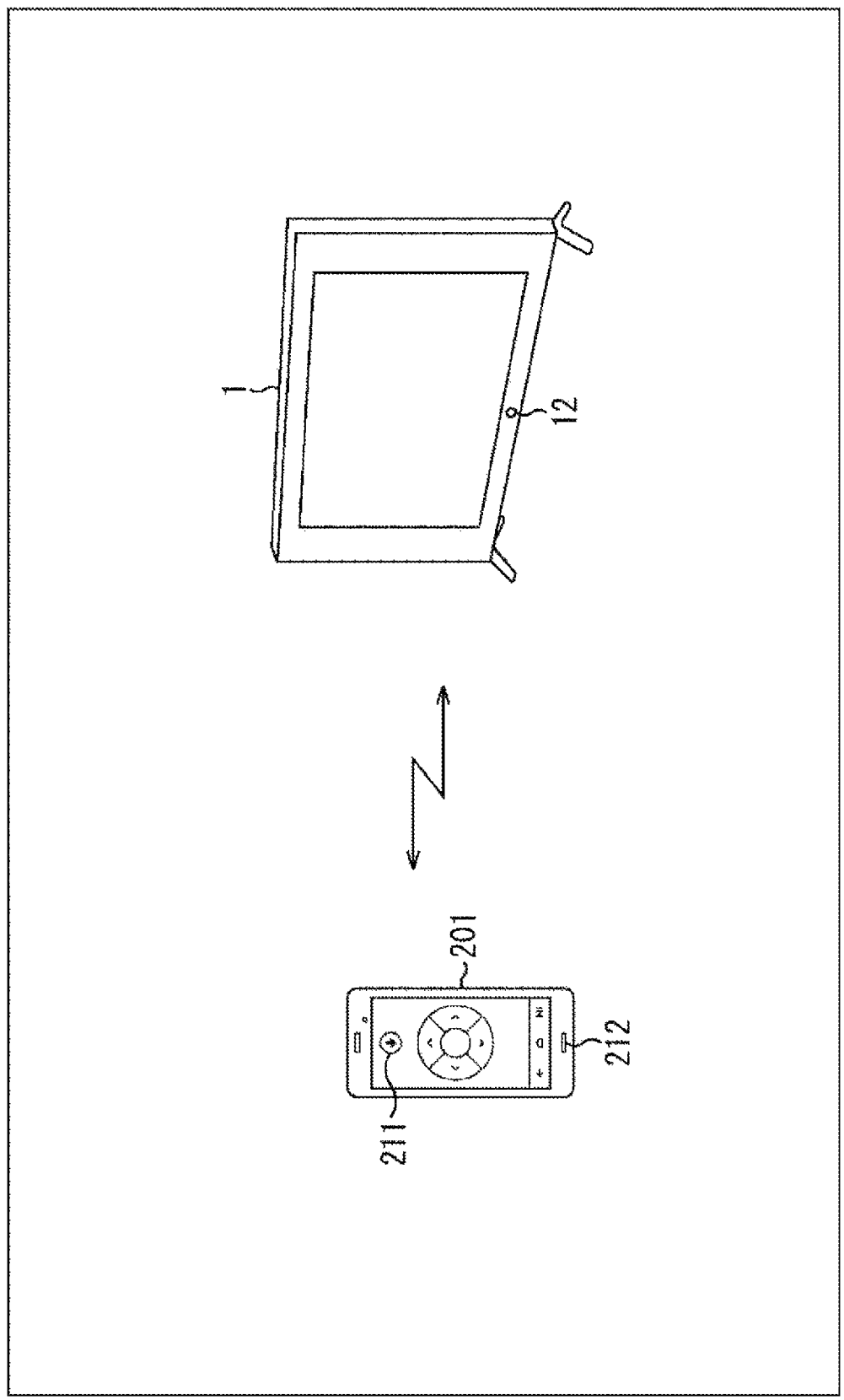
FIG. 12 is a diagram illustrating an example of a smartphone as an information processing terminal.

FIG. 12 is a diagram illustrating an example of a smartphone as an information processing terminal.

A remote control application for operating a smartphone 201 as a remote controller for the TV 1 is installed on the smartphone 201. The screen displayed on the display of the smartphone 201 in FIG. 12 is a screen of the remote control application. A user can use the display on the screen of the remote control application to operate the TV 1.

The screen of the remote control application displays various buttons such as a power button, a volume button, a channel button, a cursor button, and an enter button that have functions similar to those of the buttons provided on the remote controller 2. The screen of the remote control application also displays a microphone button 211 as illustrated in FIG. 12.

In a case where the microphone button 211 has been pressed, a microphone 212 provided in the smartphone 201 is enabled to allow for voice input as in a case where the microphone button 21 of the remote controller 2 has been pressed.

The TV 1 uses audio data detected by the microphone 212 and transmitted from the smartphone 201 as a voice recognition target. In a case where a voice recognition request has been output in response to the wake word being uttered, or in a case where a voice recognition request has been output by using the display of the GUI for voice recognition, the main body microphone is used for voice detection as described above.

Note that, as a microphone button provided on the smartphone 201, the microphone button 211 displayed on the screen of the remote control application may be used, or a physically provided button may be used.

FIG. 13 is a diagram illustrating an example of another information processing terminal.

The information processing terminal used to operate the TV 1 may be an agent device as illustrated in A of FIG. 13 or a smart speaker equipped with a voice assistant function as illustrated in B of FIG. 13. The agent device in A of FIG. 13 and the smart speaker in B of FIG. 13 basically have functions similar to those of the smartphone 201.

In this way, as the information processing terminal used to operate the TV 1, it is possible to use various devices having a microphone and an operation unit used for an operation for providing an instruction to use the microphone for voice detection.

Furthermore, the TV 1 has been described as the device to be operated by voice, and the technology described above can also be applied in a case where various devices having microphones are operated by voice.

<Example of System Configuration>

It has been described that a voice detected by the TV 1 is recognized by the voice recognition server 32. Alternatively, the recognition may be performed in the TV 1.

In this case, the voice recognition control unit 136 in FIG. 10 itself performs voice recognition on audio data supplied from the microphone control unit 133, and outputs a result of the voice recognition to the application execution unit 135.

<Examples of Determining User's Intention>

A user's intention to input a voice through the remote control microphone may be determined on the basis of various states of the user other than pressing the microphone button 21.

For example, the remote control microphone may be enabled in a case where a user continues to hold the remote controller 2 and it is determined that the user has an intention to input a voice through the remote control microphone.

Furthermore, the remote control microphone may be enabled in a case where it is detected that a user is making a predetermined gesture as a result of analysis of an image captured by the camera 112, and it is determined that the user has an intention to input a voice through the remote control microphone.

Alternatively, the remote control microphone may be enabled in a case where it is detected that a user is near the remote controller 2 or in a case where it is detected that a user is holding the remote controller 2 in hand.

In this way, it is possible to determine a user's intention by analyzing an image captured by the camera 112.

As a matter of course, the microphone button 21 may be enabled in a case where an utterance such as "input a voice through the remote control microphone" has been made, the utterance indicating that the user is presumed to have an intention to input a voice through the remote control microphone.

It is also possible to allow a user to set a state of a user's operation for enabling the remote control microphone and a state of a user's operation for enabling the main body microphone. In this case, the remote controller 2 is provided with a switch used for such a setting.

Furthermore, the main body microphone may be enabled in a case where it is detected that a user is near the TV 1 and it is determined that the user has an intention to input a voice through the main body microphone.

Furthermore, it is also possible to allow a user to preset which microphone to use in what case.

<Examples of Presenting Enabled Microphone>

The microphone being used for voice detection, that is, which microphone has been enabled, may be presented to a user.

FIG. 14 is a diagram illustrating an example of a screen display.

In the example in A of FIG. 14, a message indicating that the main body microphone is being used for voice detection is displayed at the lower right of the screen.

On the other hand, in the example in B of FIG. 14, a message indicating that the remote control microphone is being used for voice detection is displayed at the lower right of the screen.

In this way, information representing an enabled microphone may be presented. Instead of a message, an icon may be displayed as information representing an enabled microphone.

Furthermore, an enabled microphone may be presented by lighting an LED. In this case, for example, an LED provided at a predetermined position on the housing of the TV 1 lights up when the main body microphone is enabled, and an LED provided at a predetermined position on the housing of the remote controller 2 lights up when the remote control microphone is enabled.

Both the LED that lights up when the main body microphone is enabled and the LED that lights up when the remote control microphone is enabled may be provided on the housing of the TV 1.

In this way, it is possible to improve usability by showing the user which microphone is enabled. This also allows the user to make an utterance suitable for the enabled microphone.

<Configuration Example of Computer>

The series of processing described above can be executed not only by hardware but also by software. In a case where the series of processing is executed by software, a program constituting the software is installed from a program recording medium into a computer built into dedicated hardware, a general-purpose personal computer, or the like.

Figure 15:
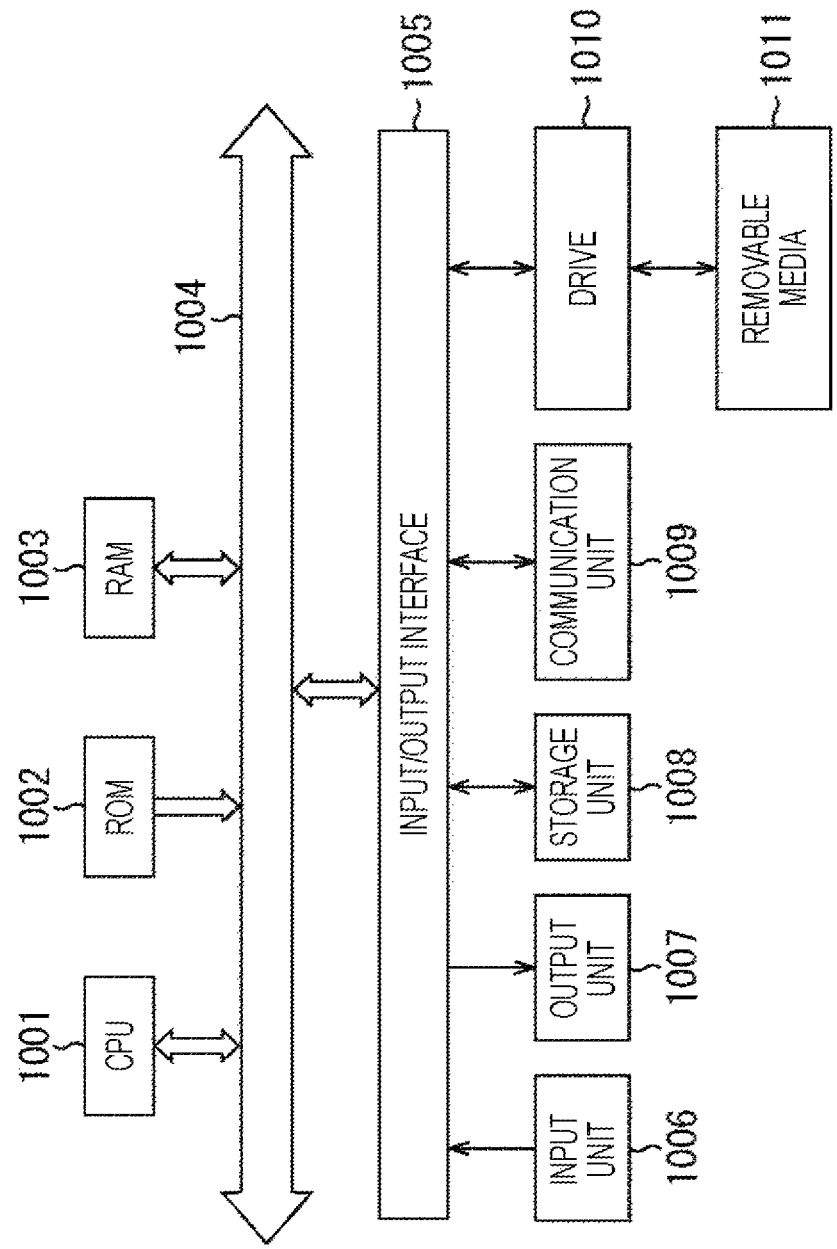
FIG. 15 is a block diagram illustrating a configuration example of a computer.

FIG. 15 is a block diagram illustrating a configuration example of hardware of a computer that executes the series of processing described above in accordance with a program.

A CPU 1001, a ROM 1002, and a RAM 1003 are connected to each other by a bus 1004.

The bus 1004 is further connected with an input/output interface 1005. The input/output interface 1005 is connected with an input unit 1006 constituted by a keyboard, a mouse, or the like, and an output unit 1007 constituted by a display, a speaker, or the like. Furthermore, the input/output interface 1005 is connected with a storage unit 1008 constituted by a hard disk, a non-volatile memory, or the like, a communication unit 1009 constituted by a network interface or the like, and a drive 1010 that drives a removable media 1011.

To perform the series of processing described above, the computer configured as described above causes the CPU 1001 to, for example, load a program stored in the storage unit 1008 into the RAM 1003 via the input/output interface 1005 and the bus 1004 and then execute the program.

The program to be executed by the CPU 1001 is recorded on the removable media 1011, or provided via a wired or wireless transmission medium such as a local area network, the Internet, or a digital broadcast, and installed on the storage unit 1008.

Note that the program to be executed by the computer may be a program that performs the pieces of processing in chronological order as described in the present specification, or may be a program that performs the pieces of processing in parallel or when needed, for example, when the processing is called.

The effects described herein are merely illustrative and are not intended to be restrictive, and other effects may be obtained.

Embodiments of the present technology are not limited to the embodiment described above but can be modified in various ways within a scope of the present technology.

For example, the present technology can have a cloud computing configuration in which a plurality of apparatuses shares one function and collaborates in processing via a network.

Furthermore, each step described in the flowchart described above can be executed by one apparatus or can be shared by a plurality of apparatuses.

Moreover, in a case where a plurality of pieces of processing is included in one step, the plurality of pieces of processing included in that step can be executed by one apparatus or can be shared by a plurality of apparatuses.

Examples of Combination of Configurations

The present technology may also have the following configurations.

(1)

An information processing apparatus including:
- a main body microphone that is a microphone provided in a housing; and
- a control unit that controls which of the main body microphone or a terminal microphone that is a microphone provided in an information processing terminal used for a user's operation is to be used to detect a voice to be recognized, on the basis of a state of the user's operation on the information processing terminal.

(2)

The information processing apparatus according to (1), further including:
- a communication unit that receives a voice detected by the terminal microphone and transmitted from the information processing terminal.

(3)

The information processing apparatus according to (1) or (2), in which
- the control unit determines, as the state of the user's operation, whether or not the user has pressed a predetermined button provided on the information processing terminal.

(4)

The information processing apparatus according to (3), in which
- the control unit uses the terminal microphone to detect a voice in a case where it is determined that the user has pressed the predetermined button.

(5)

The information processing apparatus according to (4), in which
- the control unit uses the main body microphone to detect a voice in a case where it is determined that the user has not pressed the predetermined button.

(6)
The information processing apparatus according to any one of (3) to (5), further including:
an application execution unit that executes a predetermined application,
in which the control unit determines whether or not the user has pressed the predetermined button in response to a voice recognition request being output from the predetermined application.

(7)
The information processing apparatus according to (6), in which
the voice recognition request is output in a case where the predetermined button has been pressed while the predetermined application is running, and in a case where the user has performed an operation for performing voice recognition by using a screen of the predetermined application.

(8)
The information processing apparatus according to any one of (1) to (7), further including:
a voice recognition control unit that transmits, to a server, a voice detected by the main body microphone or the terminal microphone, and receives a result of voice recognition by the server.

(9)
The information processing apparatus according to (1) or (2), in which
the control unit determines, as the state of the user's operation, whether or not the user is holding the information processing terminal.

(10)
The information processing apparatus according to any one of (1) to (9), in which
the control unit presents whether the microphone being used for voice detection is the main body microphone or the terminal microphone.

(11)
A control method including:
controlling,
by an information processing apparatus that includes a main body microphone that is a microphone provided in a housing,
which of the main body microphone or a terminal microphone that is a microphone provided in an information processing terminal used for a user's operation is to be used to detect a voice to be recognized, on the basis of a state of the user's operation on the information processing terminal.

(12)
An information processing terminal including:
a terminal microphone that is a microphone provided in a housing;
an operation unit that is used for operating an information processing apparatus and includes a predetermined button operated when the terminal microphone is used to detect a voice to be recognized; and
a communication unit that transmits the voice detected by the terminal microphone to the information processing apparatus in response to a detection request being transmitted from the information processing apparatus that controls, on the basis of a state of a user's operation on the predetermined button, which of the terminal microphone or a microphone included in the information processing apparatus is to be used to detect the voice to be recognized.

(13)
An information processing method including:
transmitting,
by an information processing terminal that includes:
a terminal microphone that is a microphone provided in a housing; and
an operation unit that is used for operating an information processing apparatus and includes a predetermined button operated when the terminal microphone is used to detect a voice to be recognized,
the voice detected by the terminal microphone to the information processing apparatus in response to a detection request being transmitted from the information processing apparatus that controls, on the basis of a state of a user's operation on the predetermined button, which of the terminal microphone or a microphone included in the information processing apparatus is to be used to detect the voice to be recognized.

REFERENCE SIGNS LIST

1 TV
2 Remote controller
11 Display
12 Microphone
21 Microphone button
22 Microphone
31 the Internet
32 Voice recognition server
121 Operation I/F unit
122 Controller
123 Operation unit
131 Operation detection unit
132 Wake word detection unit
133 Microphone control unit
134 Voice reception control unit
135 Application execution unit
136 Voice recognition control unit
201 Smartphone

The invention claimed is:
1. An information processing apparatus comprising:
a main body microphone that is a microphone provided in a housing; and
a controller configured to:
control which of the main body microphone or a terminal microphone that is a microphone provided in an information processing terminal is to be used to detect a voice to be recognized,
detect an utterance of a wake word detected on a basis of audio data supplied from the main body microphone,
enable the main body microphone and acquire audio data supplied from the main body microphone, the audio data being used for voice recognition, if the utterance of the wake word has been detected,
determine whether or not a user button enabling the terminal microphone has been pressed, if no utterance of the wake word has been detected,
enable the terminal microphone and acquire audio data supplied by the terminal microphone, the audio data being used for voice recognition, in a case where it is determined that the user button has been pressed,
enable the main body microphone and acquire audio data supplied by the main body microphone, the audio data being used for voice recognition, in a case where it is determined that the user button has not been pressed, present whether the microphone being used for voice detection is the main body microphone or the terminal microphone, control light up of a first LED included in the housing of the information processing apparatus when the main body microphone is used for voice detection, and control light up of a second LED when the terminal microphone is used for voice detection.

2. The information processing apparatus according to claim 1, further comprising:

a receiver configured to receive audio data acquired by the terminal microphone and transmitted from the information processing terminal.

3. The information processing apparatus according to claim 1, wherein the controller is configured to determine whether or not the user button is pressed in response to a voice recognition request being output from an application executed by the information processing apparatus.

4. The information processing apparatus according to claim 3, wherein the voice recognition request is output in a case where the user button has been pressed while the application is running, and in a case where a voice recognition has been requested from a user interface using a screen of the application.

5. The information processing apparatus according to claim 1, further comprising:

a voice recognition controller configured to transmit, to a server, data associated with audio data acquired by the main body microphone or the terminal microphone, and to receive a result of voice recognition by the server.

6. The information processing apparatus according to claim 1, wherein the controller is configured to determine whether or not a user is holding the information processing terminal.

7. The information processing apparatus according to claim 1, wherein the second LED is included in the housing of the information processing apparatus.

8. The information processing apparatus according to claim 1, wherein the second LED is included in a housing of the information terminal apparatus.

9. The information processing apparatus according to claim 1, including a screen and wherein the controller is configured to present whether the microphone being used for voice detection is the main body microphone or the terminal microphone, by displaying a message on the screen.

10. The information processing apparatus according to claim 1, wherein the controller is configured to present whether the microphone being used for voice detection is the main body microphone or the terminal microphone, by displaying an icon on the screen.

11. The information processing apparatus according to claim 1, wherein information processing apparatus is a television.

12. A control method comprising:

controlling, by an information processing apparatus that includes a main body microphone that is a microphone provided in a housing, which of the main body microphone or a terminal microphone that is a microphone provided in an information processing terminal is to be used to detect a voice to be recognized, detecting an utterance of a wake word detected on a basis of audio data supplied from the main body microphone, enabling the main body microphone and acquiring audio data supplied from the main body microphone, the audio data being used for voice recognition, if the utterance of the wake word has been detected, determining whether or not a user button enabling the terminal microphone has been pressed, if no utterance of the wake word has been detected, enabling the terminal microphone and acquiring audio data supplied by the terminal microphone, the audio data being used for voice recognition, in a case where it is determined that the user button has been pressed, enabling the main body microphone and acquiring audio data supplied by the main body microphone, the audio data being used for voice recognition, in a case where it is determined that the user button has not been pressed, presenting whether the microphone being used for voice detection is the main body microphone or the terminal microphone, controlling light up of a first LED included in the housing of the information processing apparatus when the main body microphone is used for voice detection, and controlling light up of a second LED when the terminal microphone is used for voice detection.

* * * * *